United States Patent
Thomasberg

(10) Patent No.: US 6,237,662 B1
(45) Date of Patent: May 29, 2001

(54) TUBELESS BICYCLE TIRE RIM AND TUBELESS BICYCLE TIRE IN COMBINATION THEREWITH

(76) Inventor: Paul R. Thomasberg, 1351 NW. Fresno Ave., Bend, OR (US) 97701

( * ) Notice: Subject to any disclaimer, the term of this patent is extended or adjusted under 35 U.S.C. 154(b) by 0 days.

(21) Appl. No.: 09/042,318

(22) Filed: Mar. 13, 1998

(30) Foreign Application Priority Data

Mar. 17, 1997 (JP) ................................................. 9-084352

(51) Int. Cl.[7] .......................... B60B 21/02; B60B 21/06; B60B 21/10; B60C 15/02; B60C 5/00
(52) U.S. Cl. ......................... 152/510; 152/513; 152/544; 152/564; 152/379.4; 152/381.4; 152/381.5; 152/382; 152/383; 152/427; 301/58
(58) Field of Search .................................. 152/516, 544, 152/378 R, 379.3, 379.4, 381.3, 381.4, 381.5, 382, 383, DIG. 9, DIG. 17, 510, 513, 427, 564; 301/95, 96, 97, 98, 58

(56) References Cited

U.S. PATENT DOCUMENTS

| | | | |
|---|---|---|---|
| 2,126,222 | * | 8/1938 | Schwinn .................... 152/381.3 X |
| 2,126,223 | * | 8/1938 | Schwinn .................... 152/381.3 X |

* cited by examiner

*Primary Examiner*—Adrienne C. Johnstone
(74) *Attorney, Agent, or Firm*—Klarquist Sparkman Campbell Leigh & Whinston, LLP

(57) ABSTRACT

The invention relates to a tubeless bicycle tire and rim. The rim is formed with opposing recesses configured to engage corresponding beads formed on the tire. With the beads engaged in the recesses, the tire and rim seal for form an air tight, sealed chamber such that no inner tube is necessary. The rim is formed with a single aperture having a valve installed therein. Preferably, the valve is formed with a ring which extends into the air tight, sealed chamber. In the event of a flat tire, the tire may be removed from the rim. The valve may also be removed by grasping the ring and pulling.

11 Claims, 7 Drawing Sheets

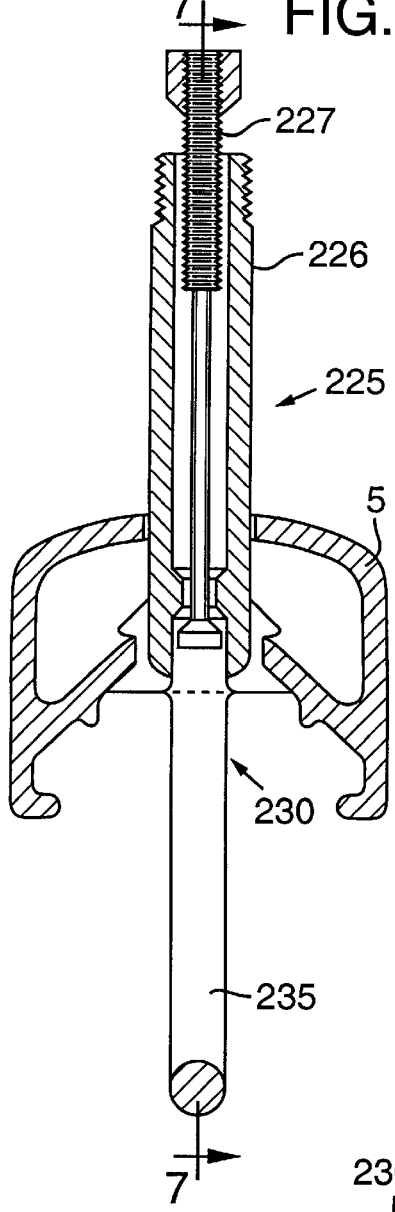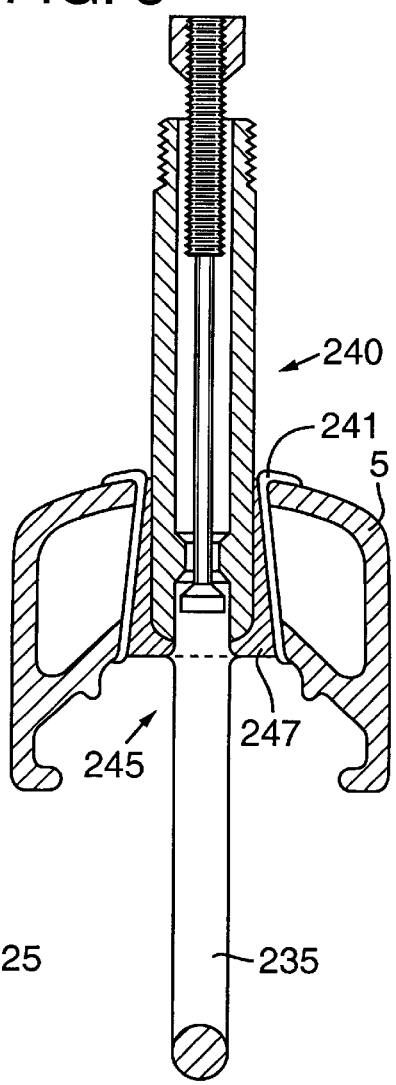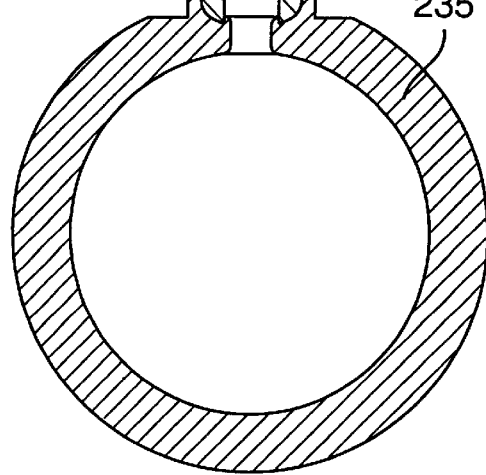
FIG. 6
FIG. 7
FIG. 8

US 6,237,662 B1

TUBELESS BICYCLE TIRE RIM AND TUBELESS BICYCLE TIRE IN COMBINATION THEREWITH

FIELD OF THE INVENTION

The invention relates to a tire and rim for use on a bicycle, the tire and rim being configured such that they do not require the use of an inner tube therewith.

BACKGROUND OF THE INVENTION

Description of Related Art

Tires used today on bicycles may generally be divided into two categories, solid rubber tires and inflatable tires. Solid rubber tires are advantageous in some applications because the bicyclist never experiences a flat tire, since solid tires do not rely on an inflated inner tube for support. However, solid rubber tires provide the bicyclist with a generally uncomfortable ride and poor response characteristics under adverse conditions, such as uneven surfaces. Further, the mass or weight of the solid rubber tire makes it unsuitable for racing, cross-country and mountain bicycling applications where weight reduction is an essential consideration.

Mountain bicyclists and racing bicyclists use inflatable tires in order to take advantage of the more desirable response characteristics inherent in inflatable tires, such as being light weight and the more comfortable ride provided by inflatable tires. Inflatable tires on bicycles require the use of an air tight inner tube which installed within a hollow portion of the tire and inflated to a desired air pressure. Such inner tubes often develop leaks. Therefore, a bicyclist often must repair the inner tube of the tire.

Further, if the bicycle goes over a sharp object or hits a rock with sufficient force, the inner tube may split due to the impact. Such splits are commonly known as pinch flats in the bicycle industry. Pinch flats are one of the most common mechanical failures serious bicyclist encounter when riding or racing. When a tire impacts on a rigid surface, the tire and inner tube are crushed between the rigid surface and the rigid rim of the bicycle wheel. Typically, the ply or multi-layer construction of the tire helps to prevent significant damage to the tire itself.

The inner tube, on the other hand, is often split resulting in a pinch flat.

Inner tubes are typically made of a generally soft, pliable, air tight rubber material. Impact between the rigid surface and the rim is often sufficient to cause the soft pliable rubber material inner tube to split. If a pinch flat is severe enough or large enough, it can be difficult to repair the inner tube and it must be completely replaced. As a consequence, mountain bicyclists and racing bicyclists typically carry one or two spare inner tubes with them in addition to an inner tube repair kit. Often, even though the split or pinch flat in the inner tube is large and may be impossible to repair, the tire itself may remain relatively undamaged.

The inventor is unaware of any bicycle tires, other than solid tires, which do not require an inner tube for inflation of a bicycle tire.

Tubeless tires are well known in the automotive industry, but such tires have vastly different dimensions, response characteristics, and construction than bicycle tires. Tubeless automotive tires are typically extremely heavy, having steel cords and other reinforcing materials therein. The technology of automotive tubeless tires requires much different considerations from those of bicycle tires. Bicycle tires, in particular bicycle tires used in racing and mountain bicycle applications, are light weight and have extremely thin side walls and treads compared to automotive tires. It is also desirable for such bicycle tires to be relatively flexible to provide good responses when riding over a rough surface. Further, bicyclist typically repair their tires themselves, in particular while racing and when bicycling in the mountains or cross-country. The configuration of automotive tubeless tires, in particular the tire beads, are such that they generally cannot be maintained, repaired or removed from the rim by a driver. Repair of automotive tubeless tires usually requires expensive mounting equipment and compressed air to seat the tire bead on the automotive wheel rim. Further, the geometry of an automotive tire, in particular the relationship between the diameter of the tire to the diameter of the rim, make automotive tubeless tire configurations unsuitable for bicycle applications.

Prior Art Rim

General terms used to describe a rim of a bicycle wheel are provided with reference to a prior art rim 15, shown in FIG. 14. In FIG. 14, the rim 15 is one of a variety of prior art rims typically used in mountain bicycle applications. The rim 15 is formed with side walls 18. The side walls 18 define a surface 28 which friction shoes engage for braking. Extending between the side walls 18 is an annular support 19. The annular support 19 is formed with a plurality of holes used to install spoke nipples. The annular support 19 in prior art rims such as the rim 15, is not air tight.

On the radial outer portion of each side wall 18 a protrusion 20 is formed. The protrusions 20 extend toward each other and assist in keeping a tire (not shown in FIG. 14) in place with respect to the rim 15 during usage. A well 22 is defined on an outer radial surface of the annular support 19. Typically the well 22 has rim strip (not shown) attached thereto to prevent an inner tube (not shown) from making contact with portions of spoke nipples which may extend through the annular support 19.

The annular support 19 is also formed with bead seats 30. The side walls 18 define bead contact surfaces 35 which are configured to engage the bead of a tire (not shown). Within the rim 15 a space 36 may be defined, for instance if the surface 28 is desired to have a large radial width. The protrusions 20 typically have a width Wp defined therebetween and a width Wr is defined between opposing bead contact surfaces 35.

It should be understood that the rim 15, and other similar rims, are intended to be used with a tire (not shown) and an inner tube (not shown) where the inner tube is inflated inside the tire. Further, the inflated inner tube urges a bead of the tire into engagement with the bead contact surfaces 35. The beads of bicycle tires are typically not designed to engage the bead contact surfaces 35 in the absence of an inner tube, and require the force of an inflated inner tube to engage bead contact surfaces 35. Further, contact between a bead of a prior art bicycle tire and the bead contact surfaces 35 is not an air tight seal and does not need to be an air tight seal because prior art tires and rims are designed to be used with an inner tube. Further, the rim 15 is typically formed with an aperture 25 through which a valve stem (not shown) of the inner tube may extend.

SUMMARY OF THE INVENTION

One object of the present invention is to configure a bicycle tire and rim used therewith, for inflation without the use of an inner tube.

Another object of the invention is to provide a quick means for removing a valve of a tubeless tire.

Another object of the invention is to reduce the mass and weight of a bicycle tire by eliminating the need for an inner tube.

Yet another object of the present invention is to provide a bicycle rim and tire with means to reduce the possibility of a pinch flat.

In accordance with one aspect of the present invention, a bicycle tire includes a carcass formed with an air tight layer and at least one casing layer. There are two annular beads formed on the tire, each annular bead formed on an inner radial edge of the carcass, each of the beads being supported by the casing layer, each of the annular beads being at least partially surrounded by a seating portion. The seating portion is formed with a generally smooth surface for seating within a bicycle wheel rim, the seating portions for providing an air tight seal between the smooth surface and the bicycle wheel rim.

Preferably, each of the seating portions is formed with an annular protrusion which extends radially outward, the annular protrusion being configured for engagement within an annular indentation formed within the bicycle wheel rim.

Preferably, the carcass is formed with an air tight layer extending between two casing layers.

Preferably, the carcass is formed with two annular shoulders, each of the annular shoulders adjacent to and radially spaced apart from each of the seating portions such that a protrusion formed on the rim extends between one of the annular shoulders and a corresponding one of the seating portions.

In accordance with another aspect of the present invention, a bicycle tire rim includes an annular rim formed with opposing first and second side walls and an annular support portion extending therebetween, the first and second side walls and the annular support portion being formed continuously such that the first and second side walls and the annular support portion are air tight with an air tight tire installed thereon. Each of the first and second side walls is formed with an annular protrusion, the annular protrusion on the first side wall extending toward the protrusion on the second side wall. First and second recesses are formed in the annular rim, the first recess being formed between a portion of the annular protrusion on the first side wall and a portion of the annular support portion, and the second recess being formed between a portion of the annular protrusion on the second side wall and a portion of the annular support portion. Each of the first and second recesses is formed with a first surface extending in a generally radial direction and second surface extending along a portion of the annular support portion at an angle of about 45° with respect to the first surface, the first and second recesses being configured to receive a bead of a tire and effecting an air tight seal between the beads of the tire and the first and second surfaces of the recesses.

Preferably, each of the first and second recesses is formed by annular protrusions formed on the annular support portion.

Preferably, each of the first and second recesses are lined with an adhesive material to effect a better air tight seal between the bead of the tire and the first and second surfaces of the first and second recesses.

Preferably, each of the first and second recesses is formed by a molded rim strip shaped an either axial side with a second annular protrusion, the molded rim strip attached to the annular support portion.

Preferably, the annular rim further includes an adhesive material covering the first and second recesses and the annular support portion. A molded rim strip is shaped at either axial side with annular protrusions, the molded rim strip attached to the annular support portion by the adhesive material. The annular protrusions on the molded rim strip partially define the first and second recesses.

Preferably, the annular rim may alternatively include an adhesive material covering the annular support portion and a molded rim strip shaped at either axial side with annular protrusions. The molded rim strip is attached to the annular support portion by the adhesive material, the annular protrusions on the molded rim strip partially defining the first and second recesses.

Preferably, the annular rim may alternatively include an adhesive material covering the first and second surfaces of the first and second recesses.

Preferably, the first and second side walls of the annular rim are formed with a circumferentially extending radially outer surface having an axial width that is approximately one fifth the radial width of each of the first and second side walls, each of the circumferentially extending radially outer surfaces is provided to reduce the force per square inch on a tire upon impact with a rigid surface.

In another aspect of the present invention, a bicycle tire and corresponding rim include a carcass formed with an air tight layer formed on a casing layer. The bicycle tire also includes two annular beads, each annular bead formed on an inner radial edge of the carcass, each of the beads being supported by the casing layer, each of the annular beads being at least partially surrounded by a seating portion, the seating portion formed with a generally smooth surface for seating within a bicycle steel rim, the seating portions for providing an air tight seal between the smooth surface and the bicycle wheel rim.

Preferably, the carcass is formed with an air tight layer extending between two casing layers.

Preferably, each of the seating portions is formed with an annular protrusion which extends radially outward, the annular protrusion being configured for engagement within an annular indentation formed within the bicycle wheel rim.

Preferably, the carcass is formed with two annular shoulders, each of the annular shoulders adjacent to and radially spaced apart from each of the seating portions such that a protrusion formed on the rim extends between one of the annular shoulders and a corresponding one of the seating portions.

Preferably, the bicycle wheel rim includes an annular rim formed with opposing first and second side walls and an annular support portion extending therebetween, the first and second side walls and the annular support portion being formed continuously such that the first and second side walls and the annular support portion are air tight with the beads installed thereon. Each of the first and second side walls is formed with an annular protrusion, the annular protrusion on the first side wall extending toward the protrusion on the second side wall. First and second recesses are formed in the annular rim, the first recess being formed between a portion of the annular protrusion on the first side wall and a portion of the annular support portion, and the second recess being formed between a portion of the annular protrusion on the second side wall and a portion of the annular support portion. Each of the first and second recesses is formed with a first surface extending in a generally radial direction and second surface extending along a portion of the annular support portion at an angle of about 45° with respect to the first surface, the first and second recesses being configured to receive the beads and effecting an air tight seal between the beads and the first and second surfaces of the recesses.

Preferably, each of the first and second recesses is formed by annular protrusions formed on the annular support portion.

Alternatively, each of the first and second recesses are lined with an adhesive material to effect a better air tight seal between the beads and the first and second surfaces of the first and second recesses.

Alternatively, each of the first and second recesses is formed by a molded rim strip shaped an either axial side with a second annular protrusion, the molded rim strip attached to the annular support portion.

Alternatively, the annular rim includes an adhesive material covering the first and second recesses and the annular support portion. A molded rim strip is shaped at either axial side with annular protrusions, the molded rim strip attached to the annular support portion by the adhesive material, the annular protrusions on the molded rim strip partially defining the first and second recesses.

Alternatively, the annular rim further includes an adhesive material covering the annular support portion. A molded rim strip is shaped at either axial side with annular protrusions, the molded rim strip attached to the annular support portion by the adhesive material, the annular protrusions on the molded rim strip partially defining the first and second recesses.

Alternatively, the annular rim further includes an adhesive material covering the first and second surfaces of the first and second recesses. Preferably, the rim is formed with a radially aperture having a removable valve mounted therein, the valve formed with an elastic ring for easily removing the valve.

Preferably, the annular rim further includes an inner annular support portion extending radially inwardly from a central portion of the annular support portion, an inner circumferential surface of the inner annular support portion formed with a plurality of bores open only to the inner circumferential surface, the bores being alternatingly slightly angularly offset from one another to accommodate spokes therein.

In accordance with another aspect of the present invention, a valve assembly for a tubeless bicycle tire assembly includes a valve body and a supporting seal member formed about a base portion of the valve body. The supporting seal member is formed with a seal portion and a ring portion. The seal portion is configured to extend through a hole formed in a bicycle rim.

Preferably, the seal portion is formed with a conical shape.

Preferably, the seal portion may alternatively be formed with an annular lip for engagement with the hole formed in the bicycle rim.

These and other objects, features, aspects and advantages of the present invention will become more fully apparent from the following detailed description of the present invention when taken in conjunction with the accompanying drawings where like reference numerals denote corresponding parts throughout.

BRIEF EXPLANATION OF THE DRAWINGS

FIG. 6 is a cross-sectional view of a portion of the front wheel of the bicycle depicted in FIG. 1, taken along the line VI—VI, in FIG. 1, with the tire removed from the rim for clarity, showing a valve configuration installed in the rim in accordance with any of the embodiments of the present invention;

FIG. 7 is a cross-sectional view of the valve depicted in FIG. 6, taken along the line VII—VII in FIG. 6;

FIG. 8 is a cross-sectional view similar to FIG. 6, showing an alternate configuration of the valve depicted in FIG. 6;

DETAILED DESCRIPTION OF THE INVENTION

Figure 1:
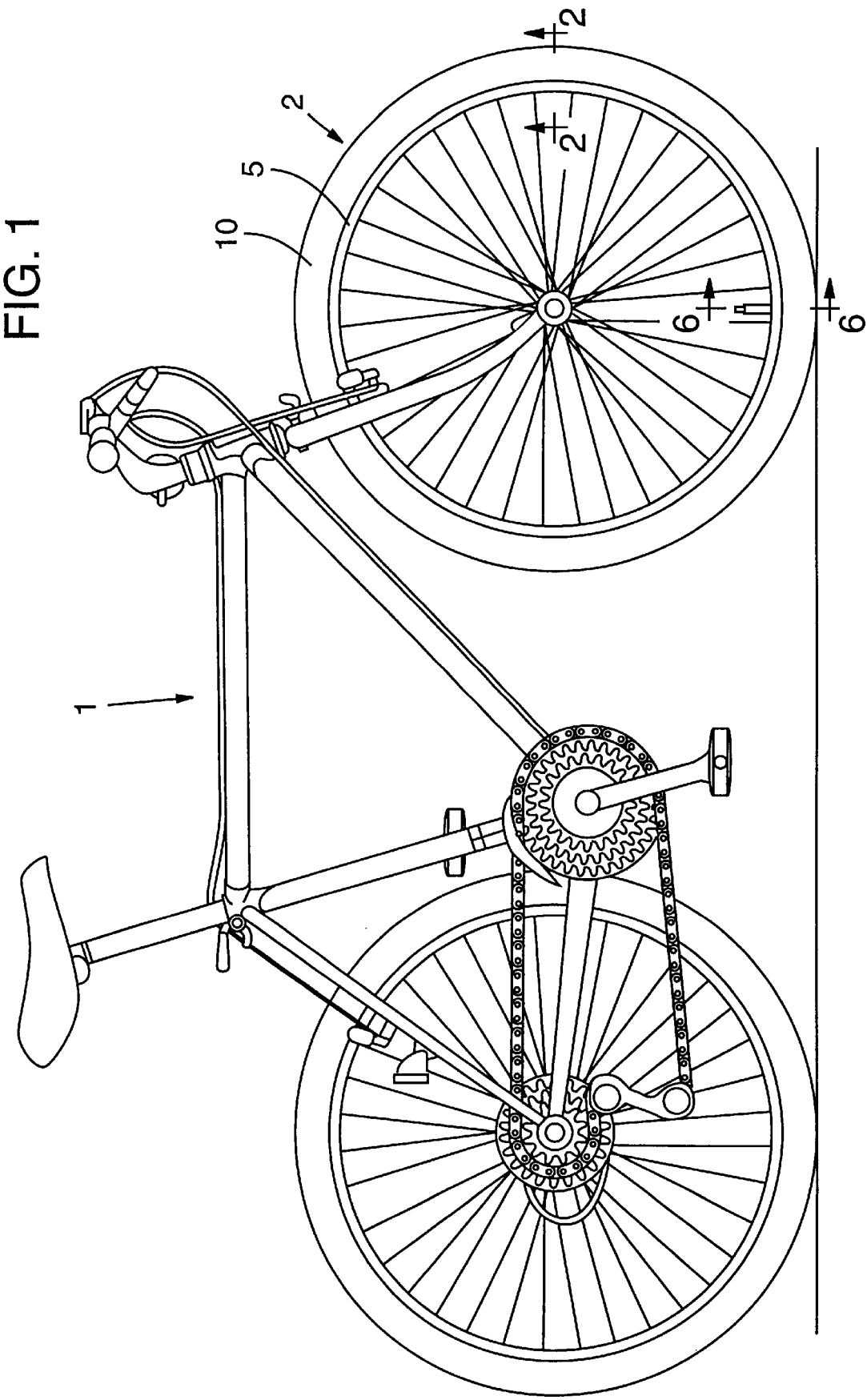
FIG. 1 is a side elevational view of a bicycle having a front tire and a rear tire, each tire mounted to a rim in accordance with a first embodiment of the present invention.

A mountain bicycle 1 is shown in FIG. 1. The bicycle 1 includes a front wheel 2 which includes a rim 5 and a tubeless tire 10, shown in FIGS. 2 and 3.

First Embodiment

Figure 2:
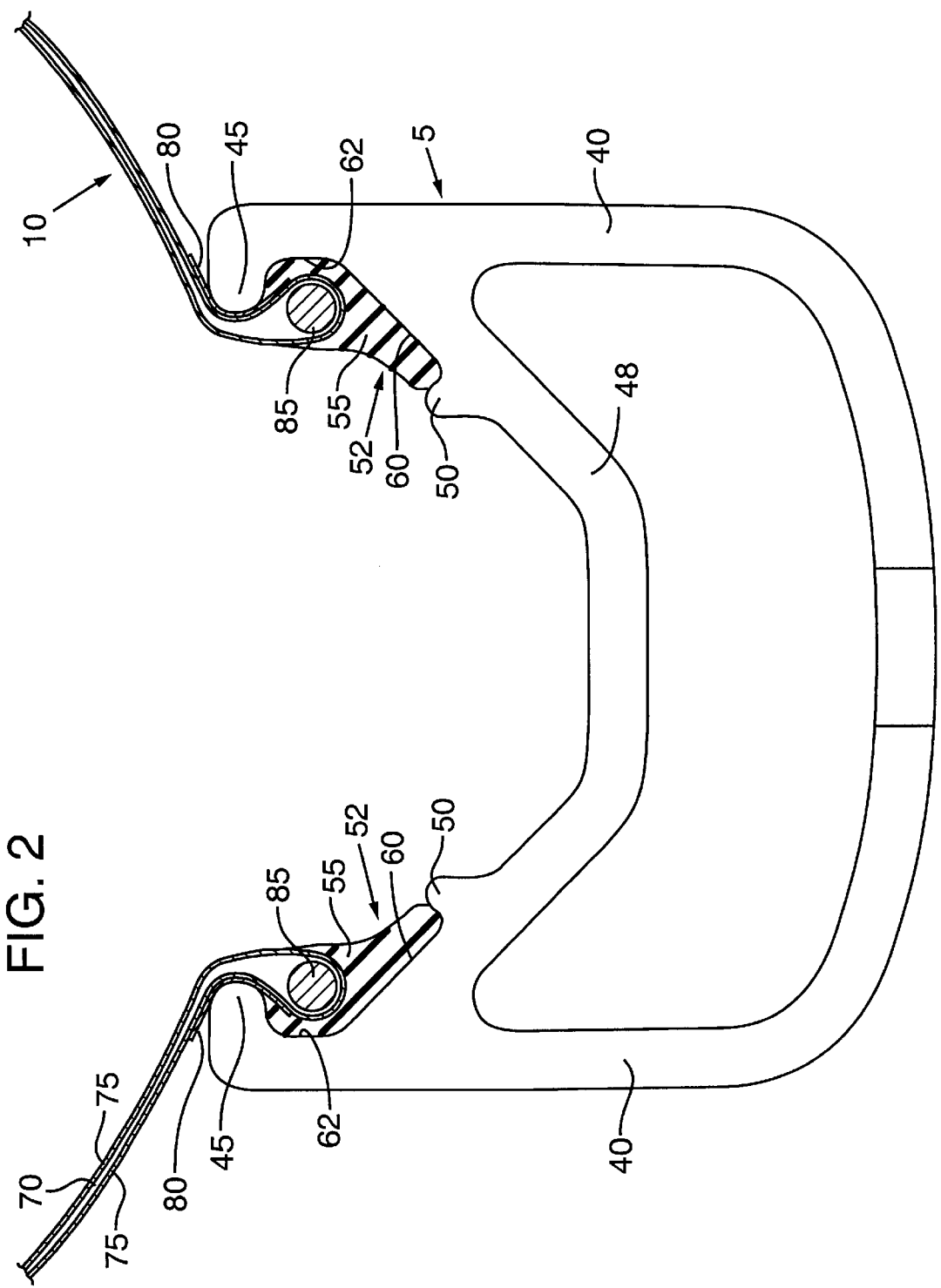
FIG. 2 is a fragmentary, cross-sectional view of the front tire and rim, taken along the line 11—11 in FIG. 1, on a slightly enlarged scale.
Figure 3:
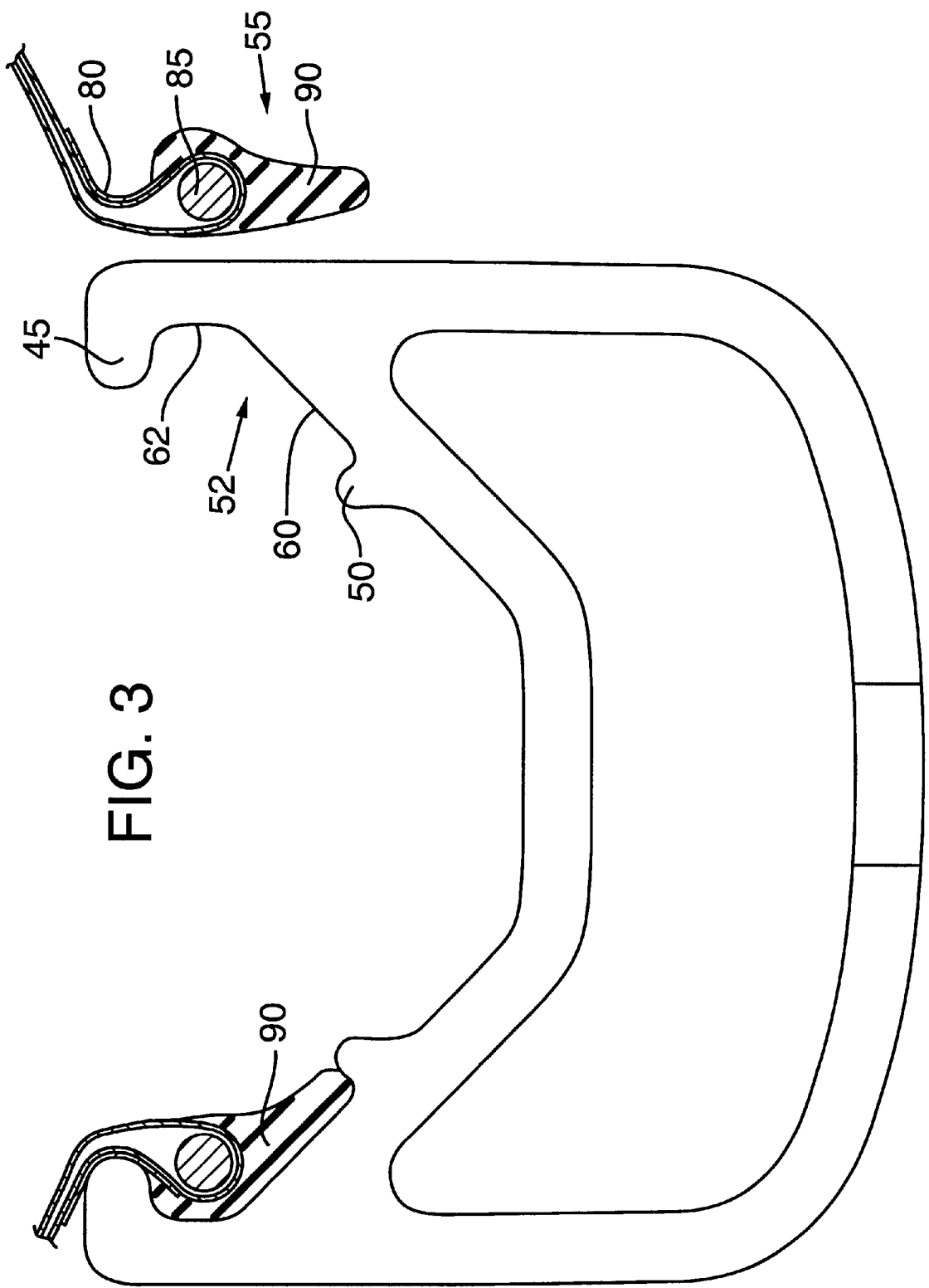
FIG. 3 is similar to FIG. 2, but also shows details of the tire, including a bead, the bead shown removed from a recess formed in the rim, in accordance with the first embodiment of the present invention.

In the first embodiment of the present invention, as shown in FIGS. 2 and 3, the rim 5 is formed with side walls 40, each side wall 40 being formed with protrusions 45. An annular support wall 48 extends between the side walls 40. The annular support wall 48 is formed with protrusions 50. A recess 52 is defined on a portion of each side wall 40 between corresponding pairs of protrusions 45 and 50. Each recess 52 is sized to fit a bead 55 formed on the tubeless tire 10. Each recess 52 includes a surface 60 which is included with respect to the axis of the rim by an angle of approximately 45°, although the angle may vary depending on the size and shape of the bead 55. It should be understood that the protrusion 50 may have any of a variety of shapes, and the recess 52 may be refined on its radially inboard side only by the thickness of the annular support wall 48, rather than with the protrusion 50 shown in FIGS. 2 and 3. Each of the recesses 52 is also formed with a wall 62 which extends generally radially outward from the surface 60 to the protrusion 45.

The tubeless tire 10 may be formed of a multi-layer material. For instance, the carcass and side walls of the tubeless tire 10, as shown in FIG. 2, are formed with an air tight membrane 70 that is sandwiched between casing layers 75. The air tight membrane 70 is made of a latex material, butyl rubber material or other resilient air tight material. The casing layers 75 are made of a fine fiber or mesh material layer to support and protect the air tight membrane 70. It should be appreciated that the above configuration of the air tight membrane 70 and the casing layers 75 may be altered. For instance, the tubeless tire 10 may alternatively be formed of one or more casing layers 75 laid one on top of another to form the carcass of the tire and the air tight membrane 70 may be forward on the inner surface of the tubeless tire. The air tight membrane 70 may be any of a variety of materials that form an air tight layer.

An annular cloth 80 is positioned on a portion of an outer axial surface each of the beads 55, as shown in FIGS. 2 and 3. Each annular cloth 80 further extends over a portion of the side walls of the tubeless tire 10. The cloth 80 is formed of, for instance, a fine cotton material, that protects the tire against abrasive contact between the protrusions 45 and the tubeless tire 10. The cloth 80 may be any of a variety of suitable materials which would protect the tubeless tire 10.

The bead 55 of the tubeless tire 10 is formed with an annular kevlar cord 85 that is partially surrounded by seating portion 90. The seating portion 90 is made of a soft supple rubber material, or butyl material, or other suitable material. The cloth 80 extends to the kevlar cord 85, but is partially covered by the seating portion 90, as is shown in FIGS. 2 and 3, so that the cloth 80 does not interfere with an air tight seal between the bead 55 and the surfaces of the recess 52. It should be appreciated that the casing layers 75 may partially wrap around the kevlar cord 85. Alternatively, one of the casing layers 75 may wrap completely around the kevlar cord 85 and the second casing layer 75 may partially wrap around both the kevlar cord 85 and the first casing layer 75.

One of the beads 55 is shown removed from the recess 52 in FIG. 3. As can be seen in FIG. 3, when not installed in the recess 52, the bead 55, and in particular the seating portion 90 of the bead 55, has a slightly arcuate shape. Therefore, when seated in the recess 52, the bead 55 is deformed slightly, the bead 55 being engaged between the protrusions 50 and 45, and being engaged against the surface 60. The seating portion 90 is preferably formed with a smooth surface to provide an airtight seal between the seating portion 90 and the surfaces of the recess 52. The seating portion 90 being made of a resilient material, easily seats against the surfaces 60 and 62 of the recess 52, thus providing an air tight seal against the inner surfaces of the rim 5.

The beads 55 of tubeless tire 10 are easily installed in the recesses 52 of the rim 5. For instance, after the beads 55 are disposed between the protrusions 45, a bicyclist may press against the carcass of the tire, generally inverting the tread (not shown) of the tire so that the bicyclists fingers may engage the bead 55, and with finger force, urge each bead 52, one at a time, into the recesses 52. Once the beads 55 are seated in the recesses 52, the tubeless tire 10 may be pressurized without the use of an inner tube.

The tubeless tire 10, when installed on the rim 5 and inflated, defines an air tight chamber that does not require an inner tube to hold air to the air tight membrane 70, the engagement between the beads 55 and the recesses 52. The tubeless tire 10 is air tight. As well, the rim 10 is air tight, making a tubeless tire possible in bicycle applications.

One advantage to the above described configuration is the reduced weight of the tire and rim since the inner tube is not required. The air tight membrane 70 in the tubeless tire 10 is formed with the carcass of the tubeless tire 10 and therefore does not need to have the thickness and mass of a typical inner tube. Therefore the weight is reduced. Further, in the above configuration, the likelihood of a pinch flat occurring is reduced since there is no inner tube that might be split in a forceful impact incident with, for instance, a rock.

Second Embodiment

Figure 4:
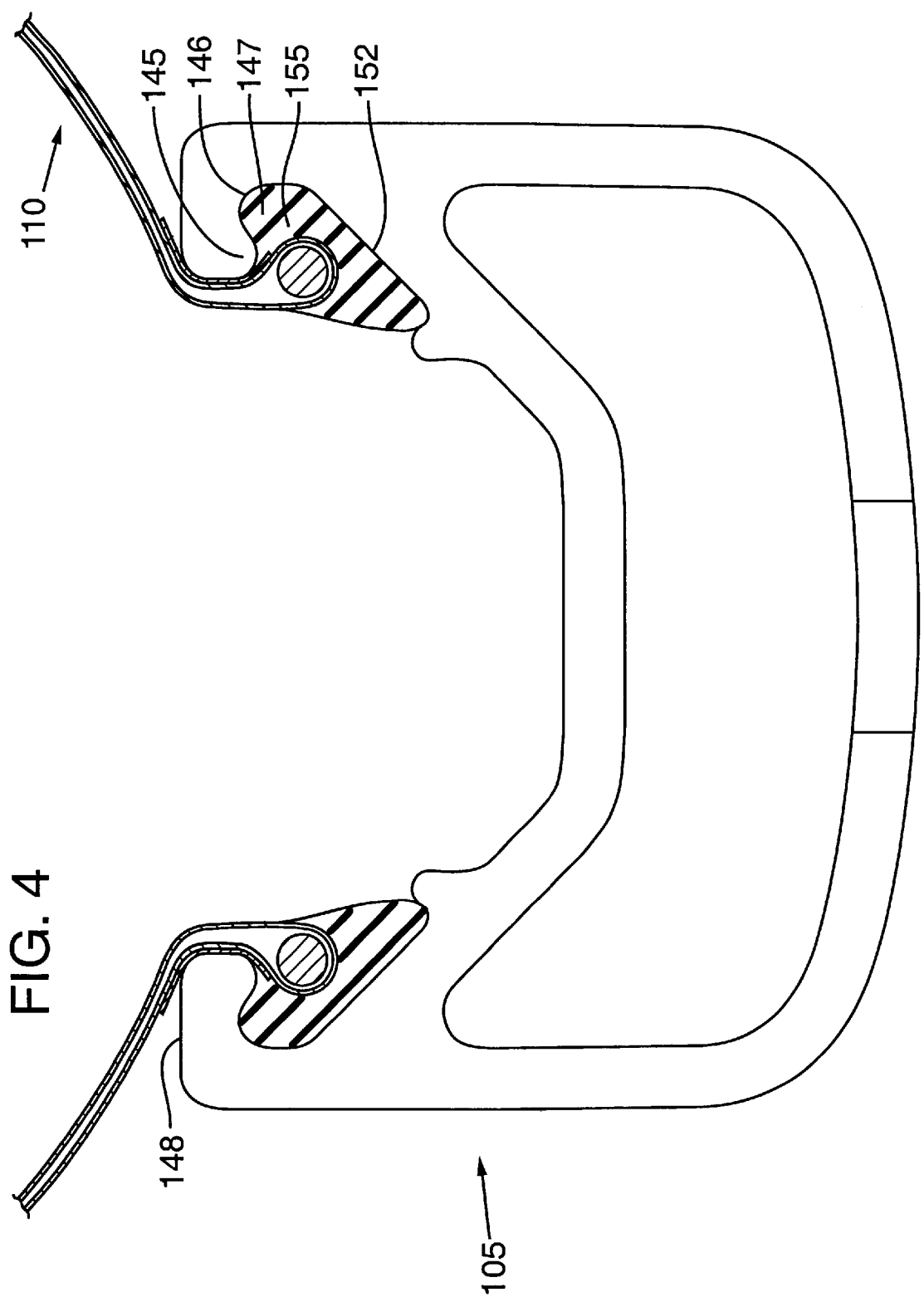
FIG. 4 is similar to FIG. 2, showing a rim and tire, the tire having a bead inserted into a recess of the rim in accordance with a second embodiment of the present invention.

A second embodiment of the present invention is shown in FIG. 4. In the second embodiment, a rim 105 and a tubeless tire 110 are provided with a recess 152 and a bead 155, respectively. The shape of the recess 152 and the bead 155 are similar to the recess 52 and the bead 55 described above with respect to the first embodiment. However, the rim 110 in the second embodiment includes extended circumferential surfaces 148 and protrusions 145. Within the protrusions 145, annular indentations 146 are defined which expand the size of the recess 152, compared to the recess 152 of the first embodiment. The annular indentations 146 correspond in shape to annular extensions 147 formed on the beads 155. The engagement between the annular extensions 147 and the annular indentations 146 further enhances the seating of the beads 155 within the recesses 152. Further, the engagement between the annular extensions 147 and the annular indentations 146 enhances the airtight seal between the beads 155 and the recesses 152.

The extended circumferential surfaces 148 are axially wider that those in the first embodiment and also are wider than those in prior art configurations. The extra width of the extended circumferential surfaces 148 helps to reduce the possibility of a pinch flat in the tubeless tire 110 whether or not an inner tube is used because upon impact with a rock or other hard surface, the wider surface area of the extended circumferential surfaces 148 reduces the force per unit of surface area, spreading the impact along a larger surface area. The extended circumferential surfaces 148 have an axially extending width that is approximately one fifth the radial width of the side walls of the rim 105. Although it should be appreciated that the width relationship between the extended circumferential surfaces 148 and the side walls of the rim 105 is approximate and that the width of the extended circumferential surfaces 148 may be any size so long as it has a dimension which provides an increase in the area that a tire might contact upon impact with a rigid surface, when compared to prior art rims.

The advantages discussed above with respect to the first embodiment also apply to the second embodiment. Another advantage to the second embodiment is a secure engagement between a bead and a recess formed in a rim to insure an air tight seal between the tubeless tire and the rim prior to inflation of the tubeless tire. The larger recess formed in the rim also assists in retaining the bead, and hence, the tire within the rim.

Third Embodiment

Figure 5:
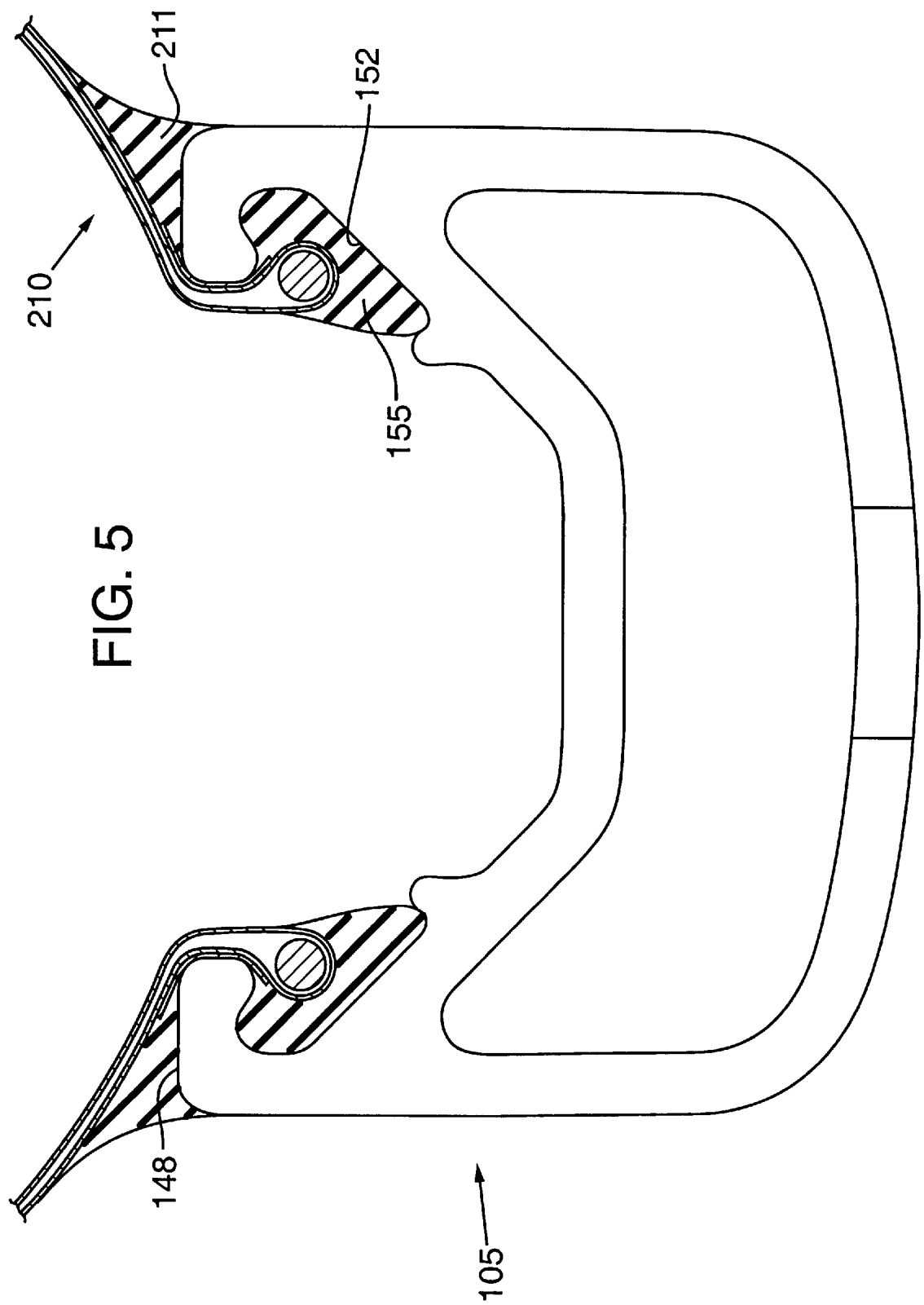
FIG. 5 is similar to FIG. 4, showing a rim and tire in accordance with a third embodiment of the present invention.

A third embodiment of the present invention is depicted in FIG. 5. In the third embodiment, a rim 105 and a tubeless tire 210 are provided with a recess 152 and a bead 155, respectively. The shape of the recess 152 and the bead 155 depicted in FIG. 5 are generally the same as the recess 152 and the bead 155 described above with respect to the second embodiment. However, the tubeless tire 210 is formed with a shoulder 211 on an outer surface thereof adjacent the bead of the tubeless tire 210. The shoulder 211 engages the radially outer extended circumferential surfaces 148 the rim 105. The shoulders 211 provide protection for the tubeless tire 210 in the event that the bicyclist should impact a hard surface causing the tubeless tire 210 to be crushed between the hard surface and the rim 105. The shoulder 211 therefore helps to reduce the possibility of pinch flat-like damage or splits to the tubeless tire 211.

The shoulder 211 may be made of any of a variety of materials, depending on the usage. For instance, the shoulder 211 could be make of either soft or rigid rubber-like material, latex or other suitable substance. It should be understood that the shoulder 211 could also be provided on the tubeless tire 10 depicted in FIG. 2. The use of the shoulder 211 on a tire is not limited to use with the bead 155 of the tubeless tire 210 or the bead 55 of the tubeless tire 10. The shoulder 211 may be used on any of a variety of tire configurations, whether or not the tire is a tubeless tire.

In addition to the advantages described above, the configuration in FIG. 5 further reduces the likelihood of a pinch flat in a tire regardless of whether or not an inner tube is used.

Tubeless Tire Valve

FIGS. 6 and 7 show a valve body 225 mounted in a valve stem hole formed in the rim 5. The valve body 225 is shown with the rim 5, but it should be understood that the valve body 225 is intended for use with all of the embodiments of the present invention, including those described above and to be described below.

Inner tubes used with prior art bicycle tires include a valve system that is unitarily formed on the inner tube. With the tubeless tire of the present invention, no inner tube is necessary. Therefore, a separate valve is required.

The valve body 225 includes a stem 226 and a valve 227 which may be any of a variety of valves. However, the specific configuration shown of the valve 227 and the stem 225 in FIGS. 6 and 7 is of a type commonly referred to as either a Presta valve or french valve and is manufactured by several different manufacturers.

At the base of the valve body 225 is a supporting seal member 230. As identified in FIG. 7, the seal member 230 has two portions, first a seal portion 232 and a ring portion 235 which are unitarily formed of a generally air tight, rubber-like material. The seal portion 232 extends through a stem hole formed in the rim 5. The seal portion 232 includes annular lip 233 which engages a portion of the rim 5 adjacent to the stem hole.

The ring portion 235 is configured such that a bicyclist may extend a finger through the center of the ring portion 235 and, with an appropriate amount of force, may pull the valve body 225 and the seal member 230 out of the rim 5. It is desirable for the valve body 225 and seal member 230 to be easily removed in the event that the tire is damaged during, for instance, a race. Rather than try to repair the tire, a bicyclist may install an inner tube within the tire 10. Temporary installation of an inner tube makes it necessary to quickly remove the valve body 225 and seal member 230. The ring portion 235 makes it possible to quickly remove the valve body 225.

FIG. 8 shows an alternate configuration of a valve body 240 and a seal member 245. In the alternate configuration, the rim 5 is provided with a sleeve 241 that may be glued or welded in place to insure an air tight connection with the rim 5. The sleeve may be made of metal or rigid plastic or polymer material, so long as it can easily maintain an air tight seal as described below. The seal member 245 has two portions, the ring portion 235 and a seal portion 247 which are unitarily formed of a rubber-like material. The ring portion 235 may be of a nature described above with the configuration shown in FIGS. 6 and 7. However, the seal portion 247 shown in FIG. 8 has a generally conical shape and a central aperture. When the seal member 245 is formed, the seal portion 247 is preferably molded around the valve body 240 during the manufacturing process so that the valve body 240 is partially encased in the seal portion 247.

The conical shape of the seal portion 247 of the seal member makes it possible for the seal member 245 to be easily removed. The conical shape of the seal portion 247 also assists in assuring an air tight seal between the surface of the sleeve 241 and the seal portion 247.

Fourth Embodiment

Figure 9:
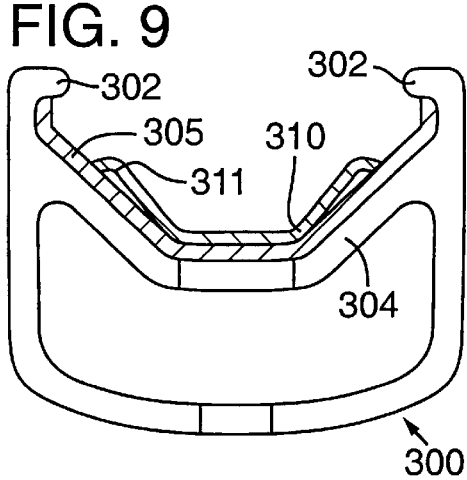
FIG. 9 is a rim in accordance with a fourth embodiment of the present invention.

A fourth embodiment of a rim 300 for the bicycle 1 is shown in FIG. 9. The rim 300 is similar to the rim 5 shown in FIG. 2 but is not formed with protrusions such as the protrusions 50 shown in FIGS. 2 and 3. Rather, in the fourth embodiment, the rim 300 is formed with protrusions 302 and an annular support 304 has no protrusions formed thereon. A well is defined in the rim 300 between the protrusions 302 and the annular support 304. The surfaces of the well and the annular support 304 are covered with a soft adhesive material 305. The material 305 is preferably a double coated acrylic foam tape such as that produced by 3M with both surfaces of the material 305 coated with a sticky or adhesive layer.

The rim strip 310 is adhered to the material 305 as shown in FIG. 9. The rim strip 310 is formed with bent protrusions 311. The protrusions 311 are provided to assist in seating a tire bead (not shown) between the protrusions 311 and 302 in a manner similar to that described with reference to the above embodiments. Further, the adhesive surface of the material 305 when contacted by a bead of a tire, assists in providing a seal between the tire bead and the rim 300. The rim strip 310 is preferably made from a light weight molded plastic material, but any light weight material able to hold a bead of a tubeless tire in place prior to inflation of the tubeless tire is acceptable. Further, the rim strip 310 need not be a continuous piece of material, but may be segmented to reduce weight, or may be made with numerous gaps or holes to reduce weight.

Figure 14:
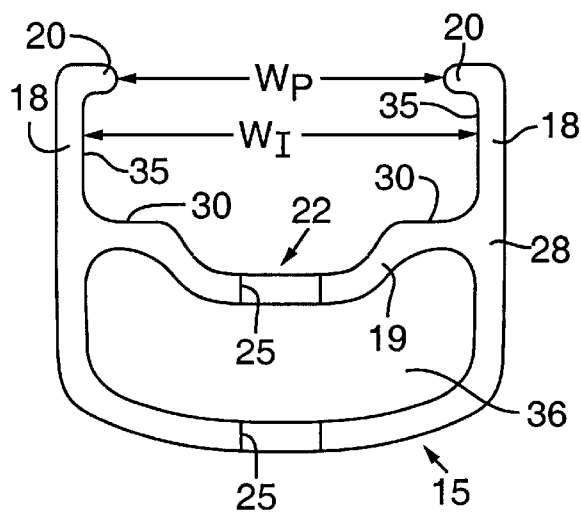
FIG. 14 is a prior art rim.

It should be understood that the use of the rim strip 310 and the material 305 is not limited to a rim such as the rim 300 depicted in FIG. 9. For instance, the prior art rim 15 depicted in FIG. 14 can be retrofitted with the rim strip 310 and the material 305 in order to accommodate a tubeless tire, such as the tire 10 shown in FIGS. 2 and 3.

Fifth Embodiment

Figure 10:
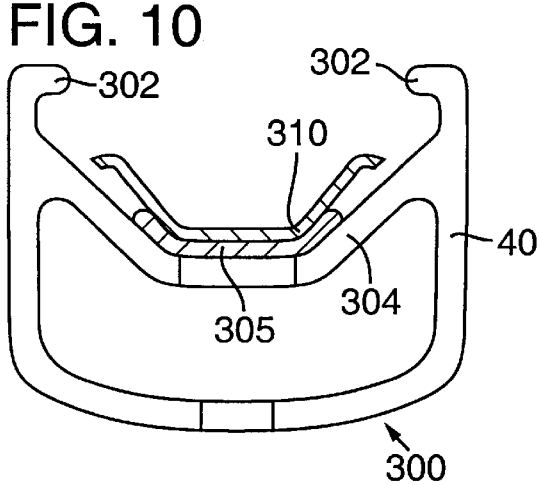
FIG. 10 is a rim in accordance with a fifth embodiment of the present invention.

A fifth embodiment of the present invention is shown in FIG. 10. In the fifth embodiment, the rim 300 is provided with the material 305 described above, but the material 305 is only disposed on a limited surface of the annular support 304 for adhering the rim strip 310 is place.

Sixth Embodiment

Figure 11:
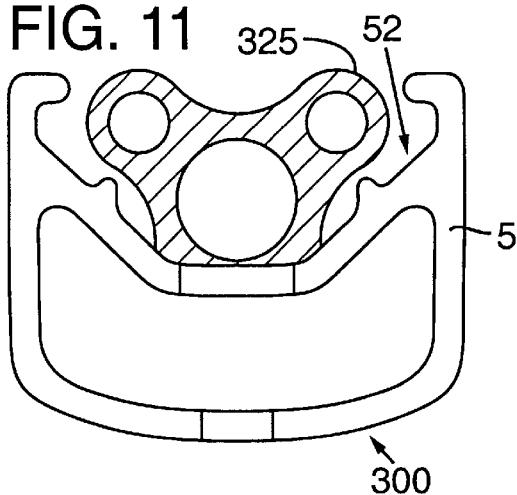
FIG. 11 is a rim in accordance with a sixth embodiment of the present invention.

In accordance with a sixth embodiment of the invention, as shown in FIG. 11, the rim 5 is provided with a rim strip 325 that is fixed within the rim 5. The rim strip 325 is installed to assist in the seating of a tire and tire bead within the recess 52. For instance, with the rim strip 325 installed in the rim 5, the beads of a tire would be trapped between the recesses 52 and the outer portions of the rim strip 325. Upon the introduction of pressurized air into the tire, the beads of the tire would seat themselves in the recesses 52 in response to air pressure.

The rim strip 325 is preferably made of a light weight, soft elastic material, such as a foam material which would add little weight to the rim. It should be appreciated that the rim strip 325 could also be retrofitted in prior art rims such as the rim 15 shown in FIG. 14.

Seventh Embodiment

Figure 12:
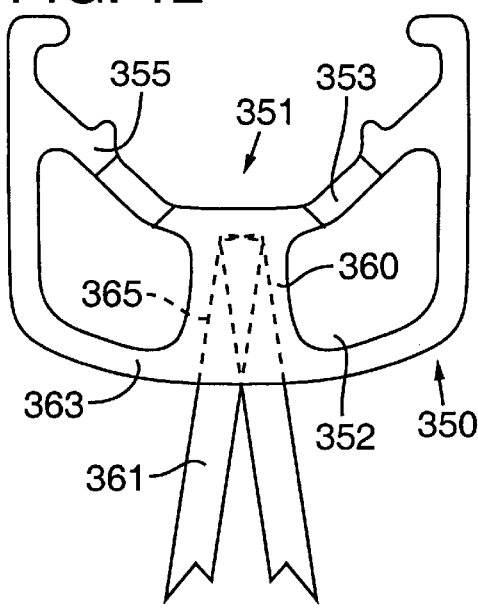
FIG. 12 is a rim in accordance with a seventh embodiment of the present invention.

In a seventh embodiment depicted in FIG. 12, a rim 350 is provided with an annular support 355 which extends between the side walls of the rim 350. Two channels or spaces 352 are defined within the rim 350, the spaces 352 being open to the well 351 of the rim 350 via holes 353. With a tubeless tire installed on the rim 350, the spaces 352 provide a pressurized air reservoir that provides alternative response characteristics to the tire (not shown). For instance, with an increase in volume within the tire provided by the spaces 252, the traction and feel of the bicycle are altered due to the increase volume of compressed air.

Between the annular support 355 and the radial inner wall 363 of the rim 350, a central support 360 is formed which separates the two chambers 352. The central support 360 is formed with apertures 365 which are alternatingly angled with respect to one another to accommodate spokes 361. The spokes 361 are threaded directly into the central support 360.

Eighth Embodiment

Figure 13:
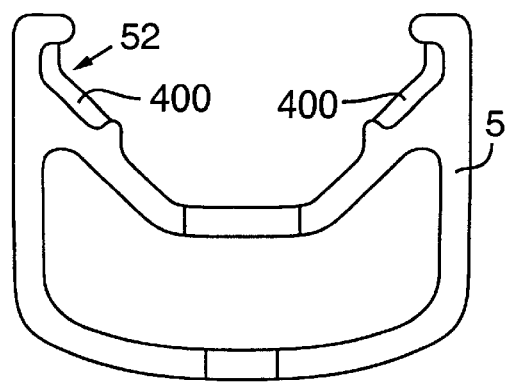
FIG. 13 is a rim in accordance with a eighth embodiment of the present invention.

In accordance with an eighth embodiment of the present invention, as shown in FIG. 13, the recesses 52 of the rim 5 are lined with double sided adhesive tape in order to assist in the seating and sealing of a bead within the recess 52. It should be appreciated, that a prior art rim, such as the rim 15 shown in FIG. 14 could be retrofitted with double sided adhesive tape in order to assist in the seating and sealing of a bead of a tire.

Various details of the invention may be changed without departing from its spirit nor its scope. Furthermore, the foregoing description of the embodiments according to the present invention is provided for the purpose of illustration only, and not for the purpose of limiting the invention as defined by the appended claims and their equivalents.

I claim:

1. A bicycle tire rim comprising:

an annular rim formed with opposing first and second side walls and an annular support portion extending therebetween, said first and second side walls and said annular support portion being formed continuously such that said first and second side walls and said annular support portion are airtight with an airtight tire installed thereon;

each of said first and second side walls being formed with an annular protrusion, said annular protrusion on said first side wall extending toward said protrusion on said second side wall; and first and second recesses formed in said annular rim, said first recess being formed between a portion of said annular protrusion on said first side wall and a portion of said annular support portion, and said second recess being formed between a portion of said annular protrusion on said second side wall and a portion of said annular support portion, each of said first and second recesses formed with a first surface extending in a generally radial direction and second surface extending along a portion of said annular support portion at an angle of about 45° with respect to said first surface, said first and second recesses being configured to receive a bead of a tire and effecting an airtight seal between the beads of the tire and said first and second surfaces of said recesses, wherein each of said first and second recesses is formed by annular protrusions formed on said annular support portion.

2. The bicycle tire rim as in claim 1, wherein each of said first and second recesses are lined with an adhesive material to effect a better airtight seal between the bead of the tire and said first and second surfaces of said first and second recesses.

3. The bicycle tire rim as in claim 1, wherein each of said first and second side walls of said annular rim is formed with a circumferentially extending radially outer surface having an axial width that is approximately one fifth the radial width of each of said first and second side walls, each of said circumferentially extending radially outer surfaces provided to reduce force per square inch on a tire upon impact with a rigid surface.

4. The bicycle tire rim as in claim 1, wherein said annular rim further comprises an inner annular support portion extending radially inwardly from a central portion of said annular support portion, an inner circumferential surface of said inner annular support portion formed with a plurality of bores open only to said inner circumferential surface, said bores being alternatingly slightly angularly offset from one another to accommodate spokes therein.

5. A bicycle tire rim in combination with an airtight bicycle tire, the bicycle tire rim comprising:

an annular rim formed with opposing first and second side walls and an annular support portion extending therebetween, said first and second side walls and said annular support portion being formed continuously such that said first and second side walls and said annular support portion are airtight with said tire installed thereon, each of said first and second side walls being formed with an annular protrusion, said annular protrusion on said first side wall extending toward said protrusion on said second side wall, and first and second recesses formed in said annular rim, said first recess being formed between a portion of said annular protrusion on said first side wall and a portion of said annular support portion, and said second recess being formed between a portion of said annular protrusion on said second side wall and a portion of said annular support portion, each of said first and second recesses formed with a first surface extending in a generally radial direction and a second surface extending along a portion of said annular support portion at an angle of about 45° with respect to said first surface, each of said first and second recesses being formed by annular protrusions formed on said annular support portion, said first and second recesses each receiving an annular bead of said tire and effecting an airtight seal between the beads of the tire and said first and second surfaces of said recesses, and the bicycle tire comprising:

a carcass, the carcass formed with an airtight layer and at least one casing layer, said two annular beads, each annular bead formed on an inner radial edge of said carcass, each of said beads being supported by said at least one casing layer, each of said annular beads being at least partially surrounded by a seating portion, said seating portion formed with a generally smooth surface for seating within the bicycle tire rim, said seating portions providing an airtight seal between said smooth surface and said bicycle tire rim.

6. The combination of the bicycle tire rim and the bicycle tire as in claim 5, wherein said airtight layer extends between two of said casing layers.

7. The combination of the bicycle tire rim and the bicycle tire as in claim 5, wherein each of said seating portions is formed with an annular protrusion which extends radially outward, said annular protrusion engaged within an annular indentation formed within said bicycle tire rim.

8. The combination of the bicycle tire rim and the bicycle tire as in claim 7, wherein said carcass is formed with two annular shoulders, each of said annular shoulders is adjacent to and radially spaced apart from each of said seating portions such that said annular protrusion formed on said side walls of said rim extends between one of said annular shoulders and a corresponding one of said seating portions.

9. The combination of the bicycle tire rim and the bicycle tire as in claim 5, wherein each of said first and second recesses are lined with an adhesive material to effect a better airtight seal between said beads and said first and second surfaces of said first and second recesses.

10. The combination of the bicycle tire rim and the bicycle tire as in claim 13, wherein said rim is formed with a radial aperture having a removable valve mounted therein, said valve formed with a ring for easily removing said valve.

11. The combination of the bicycle tire rim and the bicycle tire as in claim 5, wherein said annular rim further comprises an inner annular support portion extending radially inwardly from a central portion of said annular support portion, an inner circumferential surface of said inner annular support portion formed with a plurality of bores open only to said inner circumferential surface, said bores being alternatingly slightly angularly offset from one another to accommodate spokes therein.

* * * * *

UNITED STATES PATENT AND TRADEMARK OFFICE
CERTIFICATE OF CORRECTION

PATENT NO. : 6,237,662 B1  
DATED : May 29, 2001  
INVENTOR(S) : Paul R. Thomasberg Page 1 of 1

It is certified that error appears in the above-identified patent and that said Letters Patent is hereby corrected as shown below:

<u>Column 13,</u>
Line 8, reads "as in claim 13" should read -- as in claim 5 --.

Signed and Sealed this

Fifth Day of November, 2002

*Attest:*

*Attesting Officer*

JAMES E. ROGAN
*Director of the United States Patent and Trademark Office*